United States Patent [19]
Baer et al.

[11] Patent Number: 6,035,303
[45] Date of Patent: Mar. 7, 2000

[54] OBJECT MANAGEMENT SYSTEM FOR DIGITAL LIBRARIES

[75] Inventors: William Joseph Baer; Jane Ku Doong, both of San Jose; Jung-hsin Eva Hu, Saratoga; Steven Victor Kauffman, San Jose; Lara Marie Lewis, Campbell; Ronald Elliott Parrish, San Jose, all of Calif.

[73] Assignee: International Business Machines Corporation, Armonk, N.Y.

[21] Appl. No.: 09/017,400

[22] Filed: Feb. 2, 1998

[51] Int. Cl.[7] ..................................................... G06F 17/30
[52] U.S. Cl. .......................... 707/103; 707/100; 395/701
[58] Field of Search ........................ 707/1–10, 100–104, 707/200–206; 709/701, 245, 303; 345/333, 348; 714/38; 710/43; 380/49

[56] References Cited

U.S. PATENT DOCUMENTS

| | | | |
|---|---|---|---|
| 5,649,185 | 7/1997 | Antognini et al. | 395/609 |
| 5,757,925 | 5/1998 | Faybishenko | 380/49 |
| 5,784,553 | 7/1998 | Kolawa et al. | 714/38 |
| 5,790,855 | 8/1998 | Faustini | 395/701 |
| 5,884,078 | 3/1999 | Faustini | 395/701 |
| 5,884,097 | 3/1999 | Li et al. | 710/43 |
| 5,893,118 | 4/1999 | Sonderegger | 707/203 |
| 5,909,684 | 6/1999 | Nelson | 707/103 |

OTHER PUBLICATIONS

IBM Technical Disclosure Bulletin, p. 355, vol. 34, No. 8, Jan. 1992, "Renaming of X.400 IPM Identifier to an Alias". Inside Taligent Technology, Sean Cotter and Mike Potel, Chapter 14, Jun. 1995, "Object Storage".

*Primary Examiner*—Ruay Lian Ho
*Attorney, Agent, or Firm*—Sughrue, Mion, Zinn, Macpeak & Seas, PLLC

[57] ABSTRACT

An object management system for storing persistent object oriented objects, includes an object vault, a structural type manager and a digital library. The object vault is connected to the structural type manager and the digital library is connected to the structural type manager. An application program is connected to the object vault. Objects to be stored are represented as a Key Value Dictionary (KVD) in which attributes, or metadata, relating to the objects are stored as key-value pairs. Objects are categorized as having different structural types in which certain attributes for objects having the same structural type are cataloged to facilitate indexing and searching for the objects. The structural type manager maintains a mapping between structural types and a subset of keys for the structural types as well as corresponding database references for cataloging the object attributes. Also disclosed is a method of storing objects in the digital library where the corresponding database references for the subset of keys are retrieved from the structural type manager. The values corresponding to the subset of keys are retrieved from the Key Value Dictionary and stored in the library catalog. The Key Value Dictionary is serialized and stored in the digital library, and a signature is returned. The object stored in the digital library is retrieved by locating the objected based on the cataloged key values. Preferably the persistent objects are Java programming language objects.

21 Claims, 8 Drawing Sheets

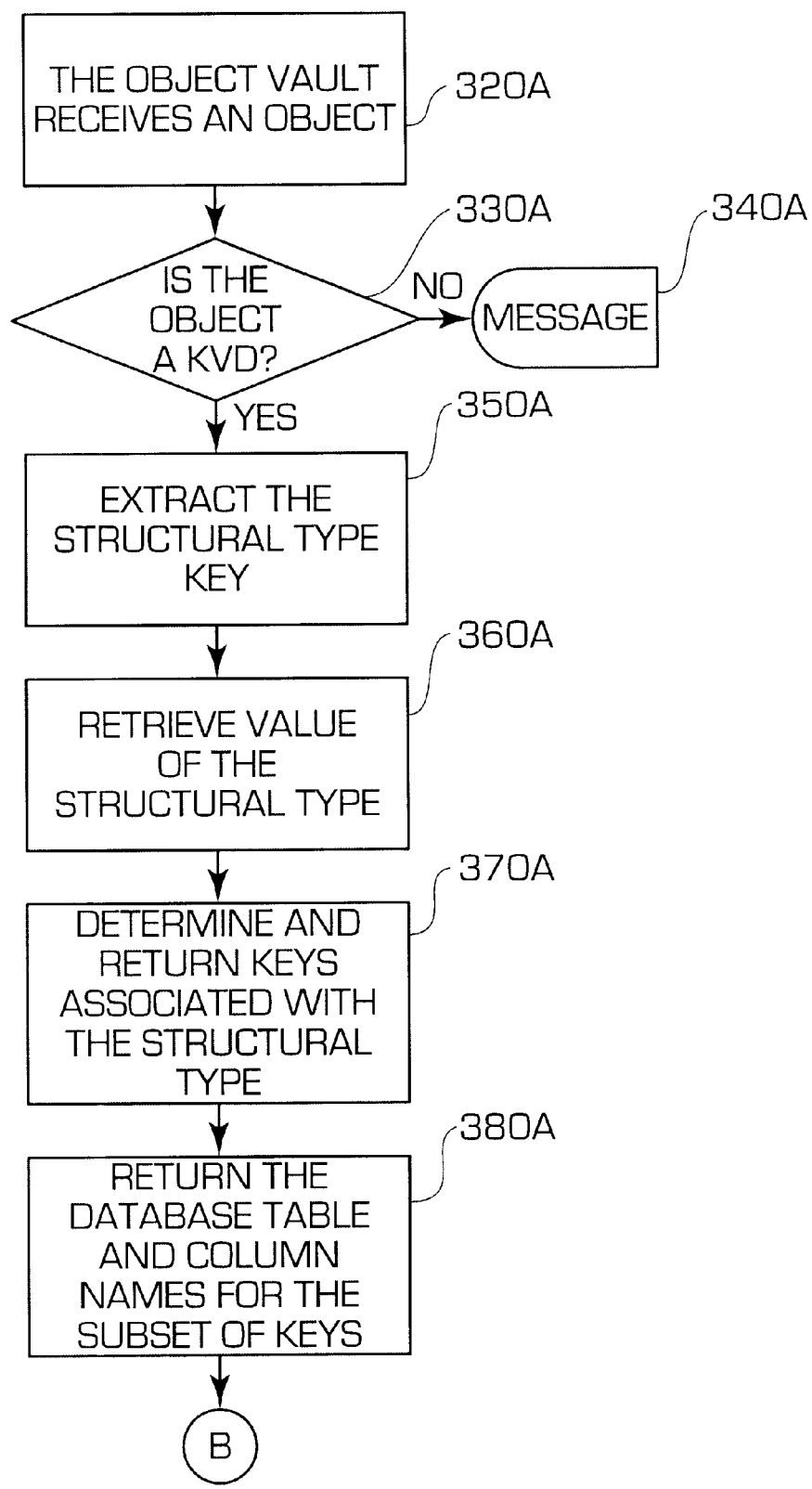

OBJECT MANAGEMENT SYSTEM FOR DIGITAL LIBRARIES

BACKGROUND OF THE INVENTION

1. Field of the Invention

The present invention relates to a method for storing and retrieving complex objects. In particular, this invention relates to a system and method for integrating object oriented objects with a digital library.

2. Description of the Related Art

The lowering of data storage costs made it feasible to store various forms of data, including digitized data. Digitized data primarily consists of digitized visual images, audio and video, although it is not limited to those types of data. Practitioners in the entertainment industry rely on digitized audio and video data. Advanced information management system structures are required to store and manage digitized data.

Just like in many other branches of computer science, object oriented representation data modelling techniques are used in the storage and retrieval of digitized data. Objects are complex forms of representing data elements and their interrelationships. Functions which were represented as procedures in conventional programming methodologies are represented as encapsulated data within objects. The advantages of using an object oriented methodology can be further enhanced if the objects can be distributed across a network. Widespread use of networks including local-area and wide-area networks and appropriate software techniques have made it possible to use distributed objects.

However, there are several problems in using distributed objects one of which is storing objects. A substantial use of program as well as programmer time is required, if a complex network of objects and their relationships have to be created each time an object oriented application is launched. Therefore maintaining persistence of objects is critical to using computing resources efficiently.

Objects must maintain their states, even though the programs that created them have terminated. In order to maintain persistence, the objects must be stored in data stores like databases or files. Object database management systems provide transparent persistence of objects. However, the users of volumes of preexisting data, as in digitized libraries, need to find a way of accessing the data as well as for representing the data in an object oriented format. There also has to be a means of committing the data in memory to a non-volatile store. In essence, a distributed object oriented system requires a storage layer that stores persistent objects.

An example of a distributed system with a storage layer that achieves persistence of objects is a digital library. A conceptual view of a digital library is shown in FIG. 1 and described in detail in U.S. Pat. No. 5,649,185 to Antognini et al. which is incorporated herein by reference. It includes a library server 110, one or more object servers 120, 121, and one or more library clients 130, 131. The library server, object servers and library clients, each have permanent storage media associated with it. That is, the library server 110 has a library catalog 140, the object servers include object stores 150, 151, and the library client includes a client cache 160. Also a communication isolator allows the library server, object servers and library clients to communicate with one another without the need for application programs in the clients being concerned with complex communication protocols. The library server, object servers and clients are arranged in a distributed manner and are connected by a communication network such as a wide area network or local area network. The library clients are typically implemented on a workstation and the library and object servers are implemented on a host processor which can be a workstation or a main-frame computer. Library clients send requests to the library servers to store, retrieve and update objects stored in the object servers. They also send requests to query the object indices and descriptive information stored in the library catalog.

The Java programnming language (hereinafter "Java") is one of the languages commonly used for representing and storing digitized data, whose features cannot be fully exploited without a mechanism for persistent storage of objects. Java provides a few basic data types, apart from which everything else in Java is an object. One of the advantages of Java pertinent to the present invention is that Java has automatic garbage collection, so that programmers do not have to worry about memory leaks. This is particularly advantageous to creators of digitized data, where large volumes of data are encountered.

An advantage of Java is that Java compilers generate an architecture-neutral compiled code that runs on several common computer architectures. Since there are few implementation-dependent aspects in Java, it is very easily portable. It is generally advantageous to provide the ability to access digitized data in a platform independent fashion. The Java programming language is becoming an increasingly popular means of providing digitized data in a platform independent manner. As in other object oriented systems, Java requires a storage layer that allows persistent storage of objects.

A dictionary is a data type commonly used in object oriented languages, including Java. A dictionary is an ordered collection of elements, each being identified with a key. Each key is associated with a value. A value can be any one of a variety of data types including a content independent binary large object (hereinafter a "blob") which can range in size up to several gigabytes of uninterpreted binary data. Keys can be strings or values. The keys in a dictionary are unique and may not be duplicated within the same dictionary. Given a key, the dictionary returns the value associated with the key. Several operations can be performed on the dictionaries, including adding, retrieving and removing items; counting occurrences of an item; and closing and deleting of dictionaries. A key value dictionary (KVD) is a subclass of a dictionary that inherits all the attributes, represented by keys and their corresponding values, from a dictionary. In addition to the attributes that a KVD inherits from a dictionary, it comprises an additional attribute, represented by a key, called a "structural type". The "structural type" attribute stores information corresponding to the structural type of the object. A hash table could be used instead of a dictionary in a preferred embodiment.

Generic Java objects can be stored as KVDs. In this case, the keys represent the object attributes and the values represent the values of the object attributes. Storage layers, including digital libraries, have been used to store persistent objects in a form according to the C++ programming language. However, they have not been used to store objects in many other object oriented languages, including Java. A storage layer, including a digital library is useful since it can store any kind of object in the form of a blob, without concern for the content of the blob.

The semantic information within a blob is contained in metadata, which refers to data about other lower forms of data. Determining the content of the blob is left to application programs. Typically, application tools do not have the necessary information as to what each blob contains and how it is to be processed.

Therefore, if objects, including Java objects, are to be stored in a storage layer like a digital library, there has to be a way of storing information (e.g., metadata) about the structure of the objects as well as a way to retrieve and reconstruct the objects. That is, information about the blob (i.e., metadata) should be stored as index information in order to later search for and retrieve the blob from the digital library. Today, such metadata is manually determined and entered by a user as blob index information. However, the manual process is cumbersome and inefficient.

SUMMARY OF THE INVENTION

It is the objective of the present invention to solve the problems associated with storing persistent objects. Specifically, an objective of the invention is to simplify indexing of objects in a storage layer. That is, an objective of the present invention is to automatically store attributes of an object in a catalog in the form of a dictionary, more specifically a KVD, to provide for efficient and simple retrieval of the object.

It is another objective of this invention to use a digital library for storing persistent objects.

Yet another objectives of this invention is to recreate the KVD by using appropriate queries to extract keys and their values and to recreate the KVD from the blob.

To achieve the objectives of this invention there is provided a method of storing an object in an object management system comprising an object vault, a storage layer and a structural type manager, comprising: sending the Key Value Dictionary to the object vault; retrieving the value for the structural type key; retrieving the subset of keys that need to be stored in the library catalog from the structural type manager; retrieving the library catalog database table names and columns for the subset of keys from the structural type manager; retrieving the values associated with the subset of keys from the Key Value Dictionary; storing the values for the subset of keys in the library catalog database in the appropriate table and column; serializing the Key Value Dictionary into a blob; storing the blob in the object server included in the digital library, and sending a signature corresponding to the Key Value Dictionary back to the object vault.

It is yet another object of this invention to create a computer program product for an object management system including an object vault, a structural type manager and a storage unit having an object server and a library catalog with a database; wherein the object vault is connected to the structural type manager and the digital library, and the structural type manager is connected to the digital library; the computer program product including a computer readable medium comprising a computer-readable object vault code and a computer-readable structural type manager code, wherein the object vault code in response to receiving an object for storage in the storage unit sends a value of a structural type indicator of the object to the structural type manager code, wherein the structural type manager code includes a mapping of the structural type indicator to a reference to a location within the database, and in response to receipt of the value of the structural type indicator returns to the object vault code on attribute for the structural type and a database identifier for the database in which a value of the attribute is to be stored and wherein the object vault code directs storage of the value associated with the attribute into the location according to the database identifier, wherein the object vault code causes the object to be stored in the storage unit, and wherein the object vault code returns an identifier for the stored object.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
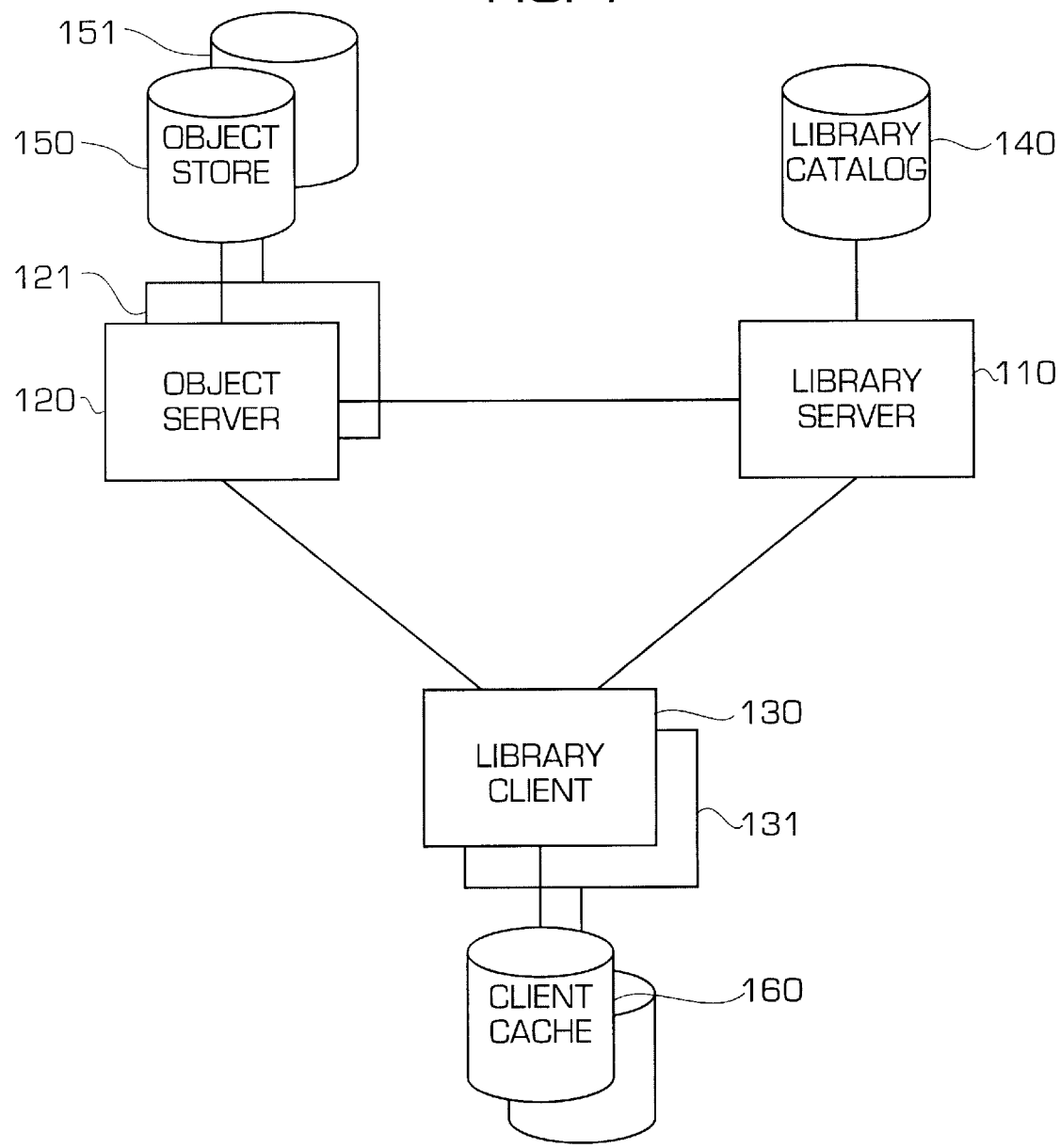
FIG. 1 is a diagram showing a conceptual model of a digital library.
Figure 2:
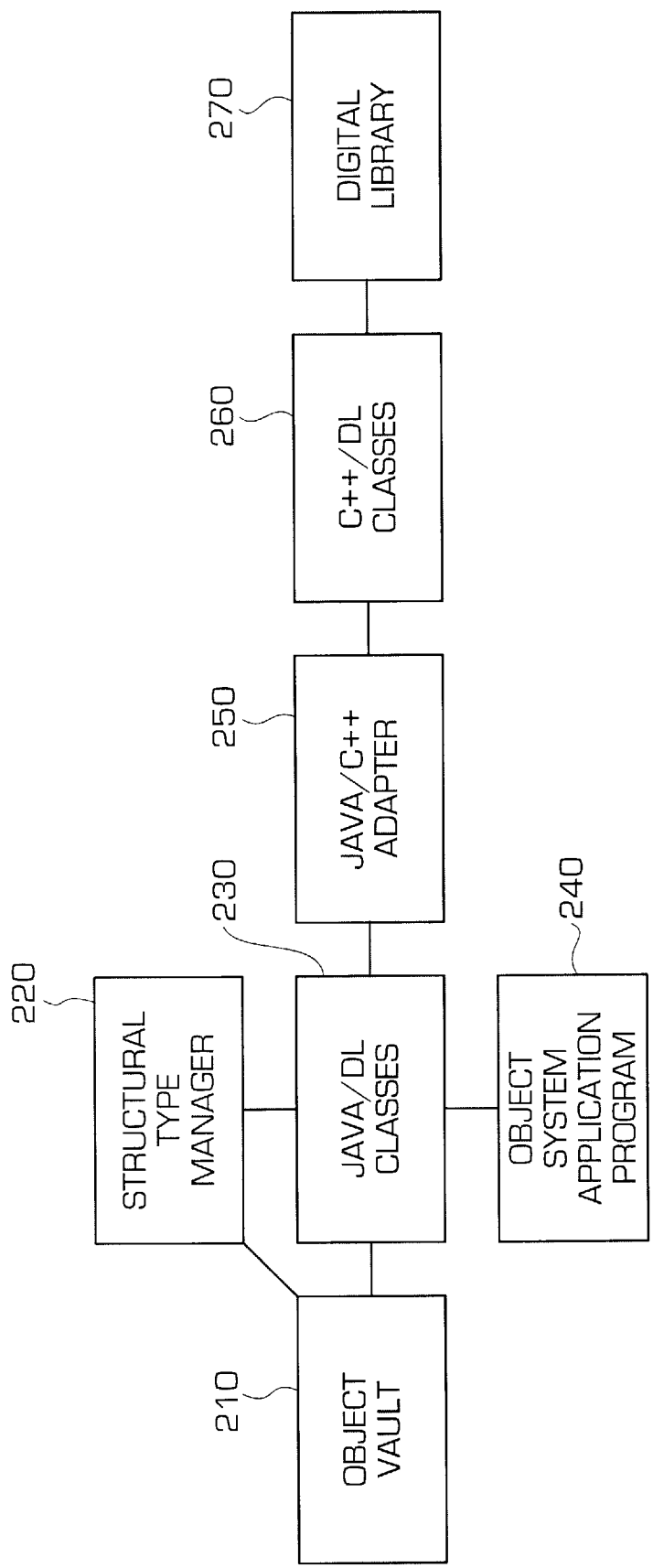
FIG. 2 is a diagram showing an object management system according to the present invention.

A block diagram of a preferred embodiment of the inventive object management system is shown in FIG. 2. The preferred embodiment of the invention is described below in terms of Java objects and a digital library used as the storage layer. However it will be readily understood that the invention is not limited to Java objects but is applicable to other types of object oriented objects as well as other types of storage layers besides digital libraries.

The object management system includes an object vault 210, which acts as a user interface to the Java object management system. The object vault is connected to a structural type manager 220. The structural type manager and the object vault can each be connected to a Java/Digital Library Class Module 230, which is a set of Java classes used to access a digital library 270. The Java/Digital Library Class Module is connected to a Java application program 240. A Java/C++ Adapter 250, is connected to the Java/Digital Library Class Module and to a C++/Digital Library Class Module 260 and operates to interface Java classes to predefined C++ classes. The C++/Digital Library Class Module is connected to the digital library 270 and provides an interface to the digital library for C++ objects. The Java C++ Adapter 250 and C++ Digital Library Class Module 260 are not needed if the digital library supports Java classes directly.

An asset is a combination of content as well metadata about an object. An asset is stored in the digital library by storing the content, or blob, in an object server of the digital library, while the metadata is stored separately from the content in a row in a table within the library catalog of the digital library. The object vault 210 is an interface to the object management system. The objects that are to be stored in the object management system are entered through the object vault. Its functionality is facilitated by a set of application program interface (API) functions. These API functions enable a user to store, retrieve and delete data as well as metadata in the digital library. The object vault comprises several generic objects including signature and KVD objects. A signature is a character string ID that uniquely identifies an asset. Each API within the object vault has available to it a set of Java classes that perform transaction control, version name support, asset creation, asset deletion, asset locking, asset retrieval and asset queries.

The object vault is primarily a repository of APIs for interacting with the digital library. It includes digital library session information to enable multiple calls to access the digital library within a user session. The object vault extensively uses generic objects to pass information to and from the user (in this case a user's program), including a signature and a KVD. A signature is a character string ID that uniquely identifies an asset in the digital library data store. Given a signature of an asset the object vault has a set of APIs to retrieve the metadata and the content of the asset. The metadata is represented as a KVD, and the content is represented either as a byte stream that can be used in memory or written into a file.

Figure 4:
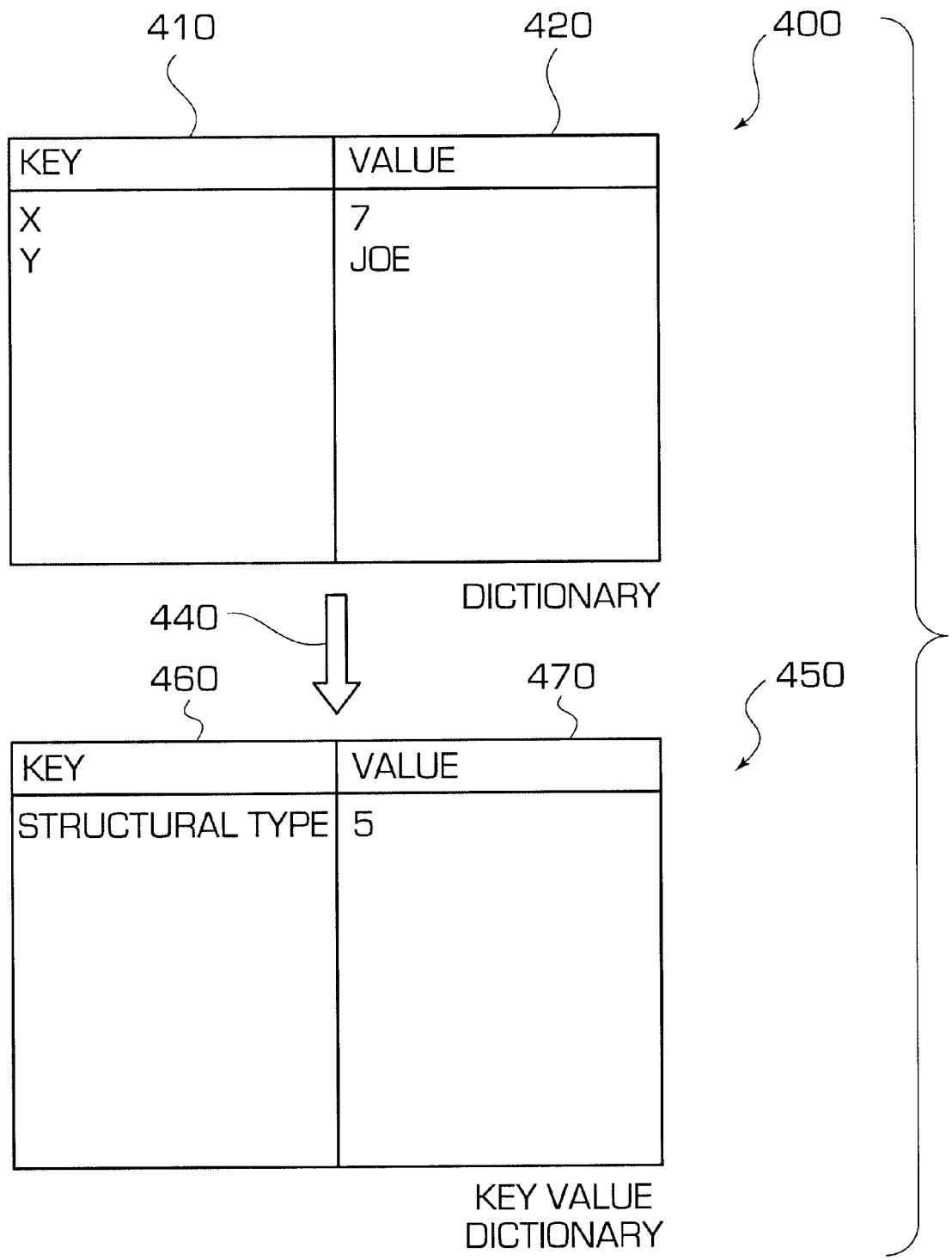
FIG. 4 is a conceptual view of a Dictionary and a Key Value Dictionary.

FIG. 4 is a conceptual view of a dictionary 400 and a KVD 450. The Dictionary includes keys 410 and values 420. A KVD 450 inherits the attributes of the dictionary 400, as represented in FIG. 4 by arrow 440. The KVD includes keys 460, including the structural type key, and corresponding values 470.

The structural type manager operates to manage a schema mapping between a KVD and the digital library database tables. Each KVD is defined as one of a predetermined number of structural types. The structural type manager includes a structural type table and a plurality of mapping tables. The structural type table comprises two columns. The first column consists of the different predetermined structural types of objects that are to be stored in the object management system, and the second column consists of a pointer to a mapping table for each of the different structural types. Thus, the structural type manager includes a mapping table associated with each of the structural types. Each mapping table associates a subset of keys from the KVD for the particular structural type associated with the mapping table, with a table name and a column name in the digital library catalog.

Figure 5:
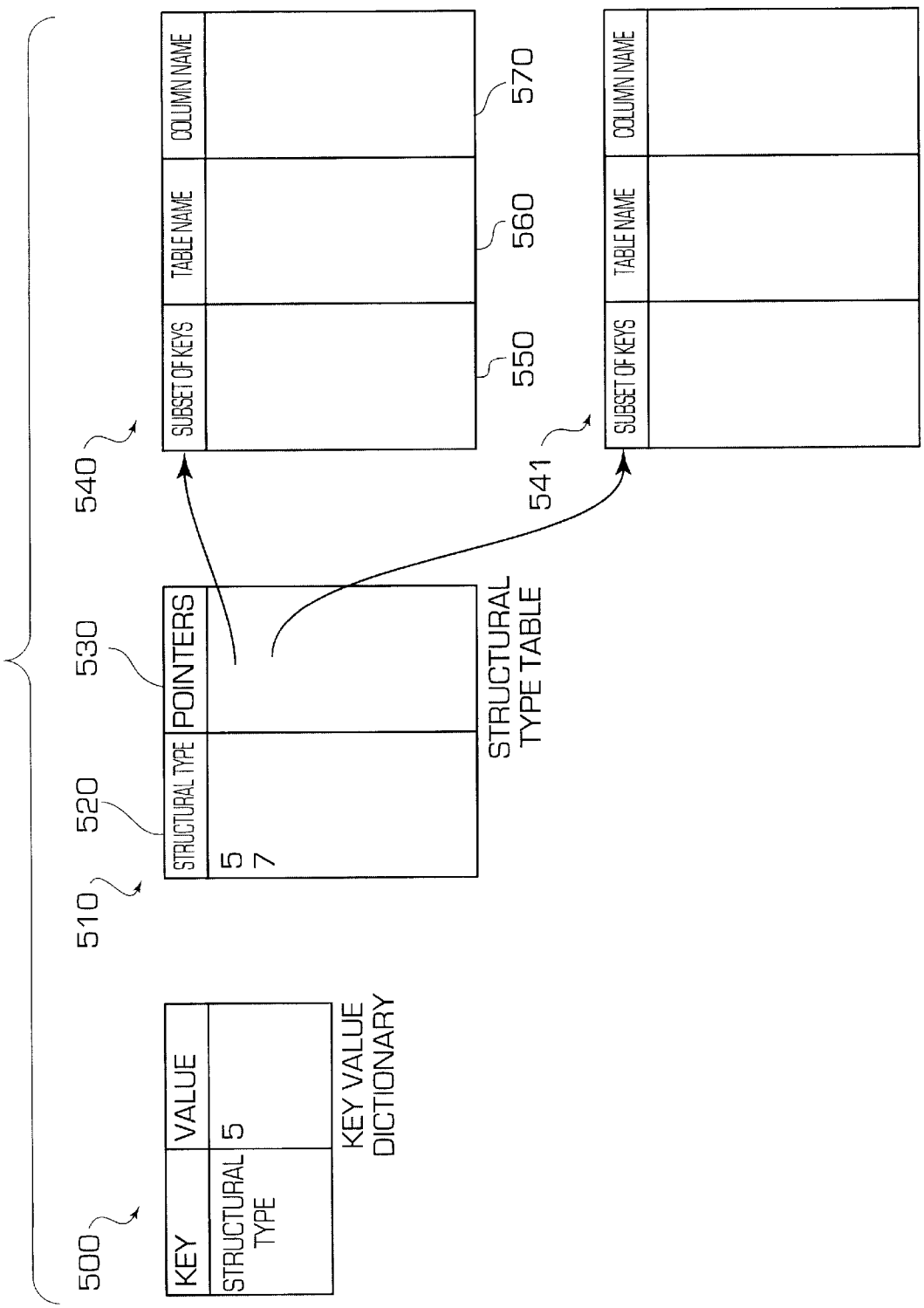
FIG. 5 is a conceptual view of the data stored in the structural type manager.

FIG. 5 is a conceptual view of the structural type manager 220, which shows an instance of a KVD 500. An identifier of the structural type is recorded in the first row of KVD 500. This structural type identifier maps into the structural type table 510. The first column 520 of the structural type table lists all the predetermined structural types. The second column 530 of the structural type table contains pointers to mapping tables, such as mapping tables 540 and 541. The first row 550 in the mapping table 540 lists the subset of keys from the KVD 500 to be used for indexing the object in the library catalog an object of structure type "5". The second and third rows, 560 and 570, respectively, in the mapping table 540 associate a table name and a column name for each key of the subset of keys from the KVD 500. In the case of using a digital library to store the objects, the table name row 560 and column name row 570 identify a table and column, respectively, in the library catalog in which the associated key value is recorded.

The following methods shown in Table 1 are used by the structural type manager 220 to store and retrieve objects.

TABLE 1

| METHOD NAME | DESCRIPTION |
| --- | --- |
| createStructuralTypeMap (Name, key Name, key Type, table ID, column position) | Create a structural type map and populate it with one key. An attribute includes information about the attribute name, the table ID, the column ID, the column position, and the data type |
| createKey (Name, key Name, key Type, table ID, column position) | Create an attribute for an existing structural type map |
| removeKey (map Name, key Name) | Remove an attribute from the key list in the structural type map |
| removeStructuralTypeMap (Name) | Remove a structural type map that is identified by a type name |
| getTableID (Name) | Answer the database table ID of the table storing the given structural type |
| getKeyNames (Name) | Answer an ordered list of the contribute names for a given structural type |
| getAttributePositions (map Name) | Answer an ordered list of table column positions for each key of a given structural type |

Operation of the object management system according to the invention is now described below. A KVD is produced in the inventive system for managing Java objects. The KVD is sent to the object vault 210 for storing in the digital library. The object vault recognizes that it has received a KVD and accesses the structural type manager 220. The KVD contains a key called the structural type key. The value associated with the structural type key denotes the structural type of the KVD, which is one of the predetermined structural types. The object vault extracts the structural type of the KVD and sends a request to the structural type manager for storage information relating to the structural type of the KVD.

The structural type manager, upon receiving the structural type key, accesses the structural type table 510 to obtain a pointer to the appropriate mapping table 540. From the mapping table the appropriate table and column names for the subset of keys associated with the identified structural types are retrieved and sent back to the object vault. Thus, when the structural type manager receives a structural type key it returns a set of database references for the subset of keys within the KVD.

For each key within the subset of keys identified by the structural type manager, the object vault extracts from the KVD the value associated with that key. It then stores the value in the corresponding database reference provided by the structural type manager for the corresponding key. The net result of this process is that a subset of keys within the Key Value Dictionary, appropriate for indexing the object in the digital library, is transferred to the digital library's library catalog. The object vault transforms the KVD into a blob for storage into the digital library's Object Server. The Java "serialize" command can be used, for example, to perform the serialization.

The Java/Digital Library Class module 230, consists of a set of Java classes that are used by the object value to access the digital library. In the preferred embodiment the digital library provides a C++ objected oriented interface. The Java/C++ Adapter, matches a Java digital library class with a corresponding C++/digital library class and then sends appropriate messages to the C++/digital library class. The C++/digital library classes module 260, consists of the C++ classes used to interface with the digital library 270. Examples of C++ classes which can be included in the C++/digital library class module 260 are described in U.S. patent application Ser. No. 08/688,120, which is incorporated by reference herein.

An example use of the preferred embodiment relates to artists working on an animation sequence in which each layer, frame and sequence of the animation can be represented by a Java object. Each animation sequence includes a series of frames displayed in the sequence. Each frame can include a series of layers, such as a background layer, a character layer and a foreground layer. Complex frames can include many layers. The relationship between the Java objects is represented using a directed acyclic graph. Key Value Dictionaries are preferably used to represent individual Java objects within the directed acyclic graphs. The present invention uses a digital library to store and catalog the Key Value Dictionaries.

Figure 3B:
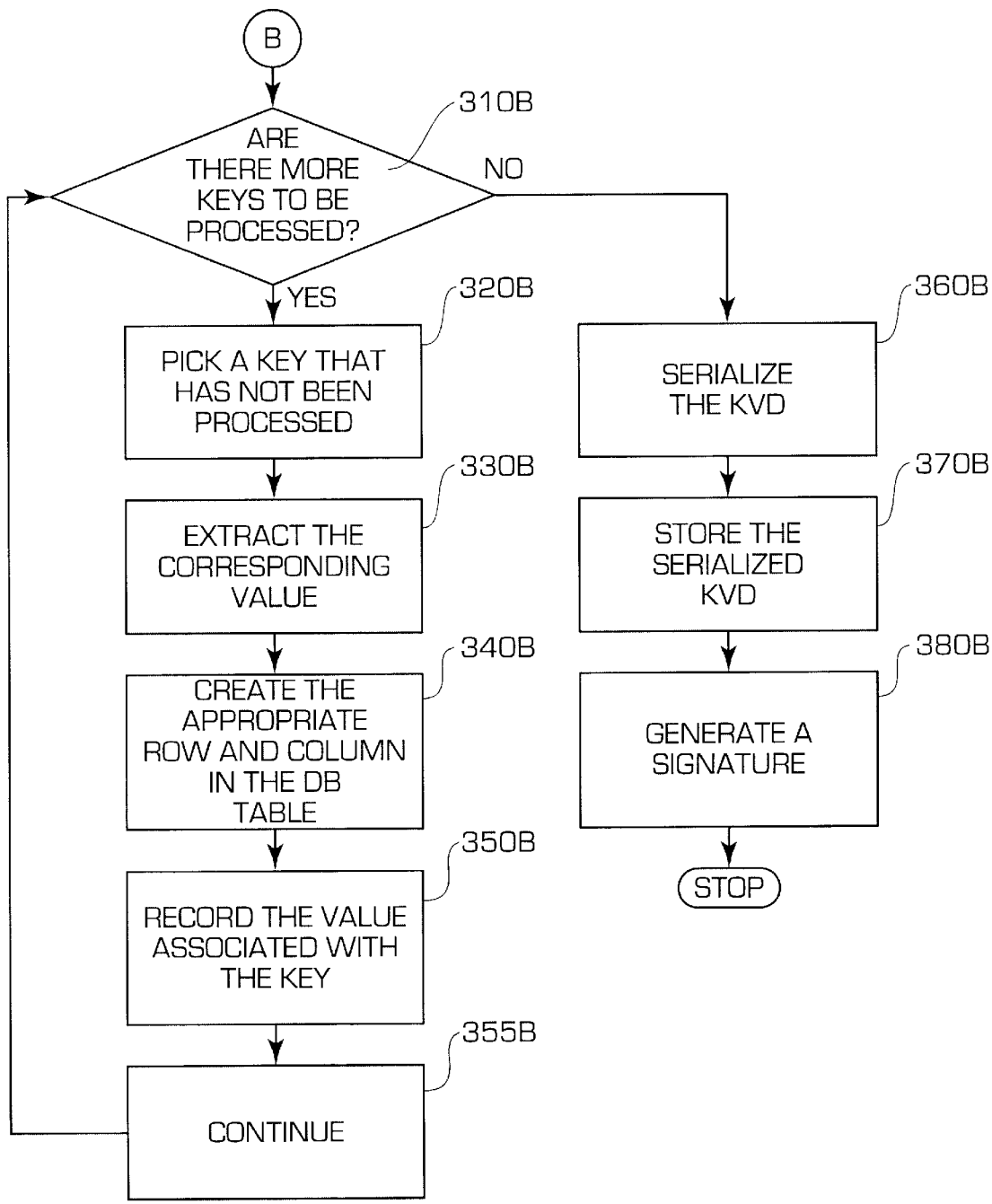
FIGS. 3 A,B and C show flowcharts depicting stages of a store operation for a Java object according to the present invention.

FIG. 3A and FIG. 3B together represent a flowchart that details a store operation according to the present invention. An object, which could be a Java object, represented as a KVD, is sent to the object vault 210. In step 320A the object vault 210 receives an object. In step 330A the object vault checks to see if the received object is a KVD. If the received object is not a KVD, an appropriate message is returned in step 340A in response to receiving the object. If the object is a KVD, in step 350A the object vault extracts the value in the KVD corresponding to the structural type key and accesses the structural type manager 220. In step 360A the structural type manager receives from the object vault the value of the structural type key for the KVD. In step 370A the structural type manager determines and returns the subset of keys associated with the structural type of the KVD. In step 380A the Structure Type Manager returns the database table and column names for each key of the subset of keys for the determined structural type.

In step 310B, shown in FIG. 3B, the object vault enters into a loop and performs steps 310B to 350B for each key in the subset of keys. In step 320B the object vault selects from the subset of received keys the next key that has not yet been processed. In step 330B the object vault extracts the value corresponding to the selected key from the Key Value Dictionary. In 340B the object vault creates an appropriate row in the database table identified by the structural type manager for the selected key. In step 350B the value associated with the key is recorded in the row of the database. At step 355B the loop continues, until in step 310B it is determined that no more keys are left to process.

In step 360B the object vault serializes the Key Value Dictionary to create a blob. In step 370B the object vault stores the serialized Key Value Dictionary in an object server of the digital library under control of the library server, and in step 380B a signature is generated by the object vault based on the storage of the blob for return to the entity providing the KVD.

Figure 3C:
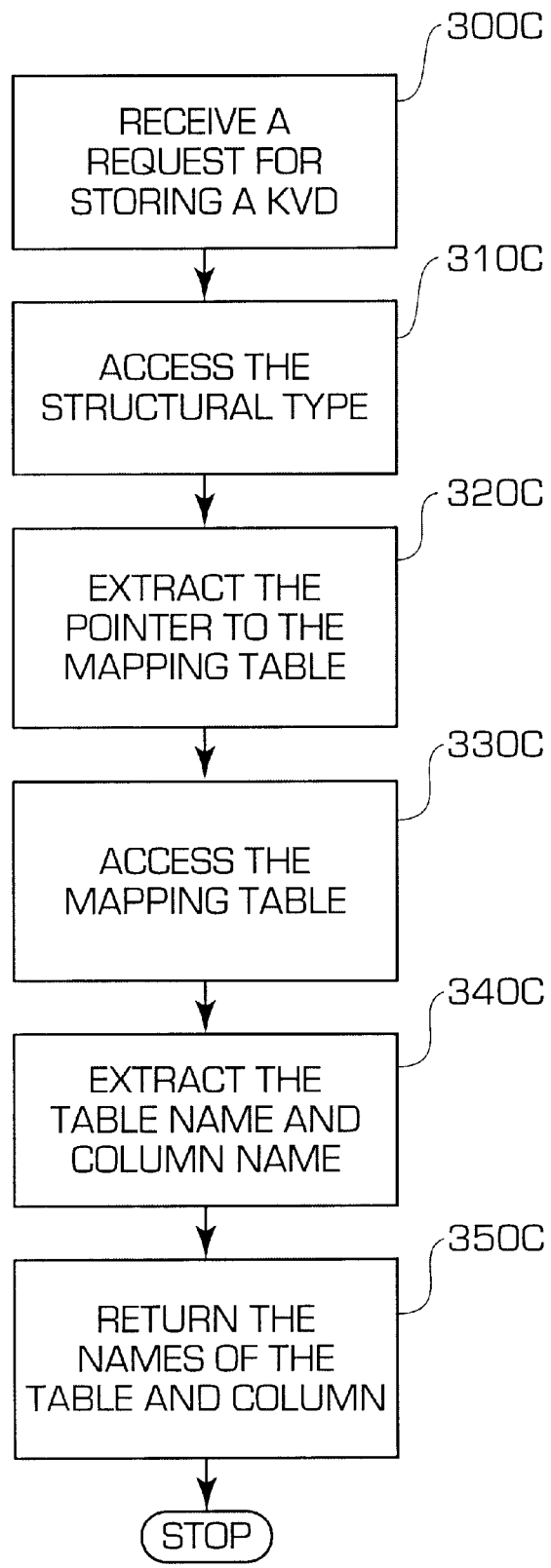

FIG. 3C shows a flowchart depicting how the structural type manager operates. In step 300C the structural type manager receives a request for storing a KVD, along with a structural type of the KVD. In step 310C it accesses the structural type table, and in step 320C it extracts the pointer to the corresponding mapping table for the received structural type. In step 330C the structural type manager accesses the mapping table based on the extracted pointer. In step 340C the structural type manager extracts from the mapping table the names of the database table and the database column for each key in the subset of keys for the structural type of the KVD. In step 350C the names of the database table and column are returned to the object vault for each key of the subset of keys.

Figure 6:
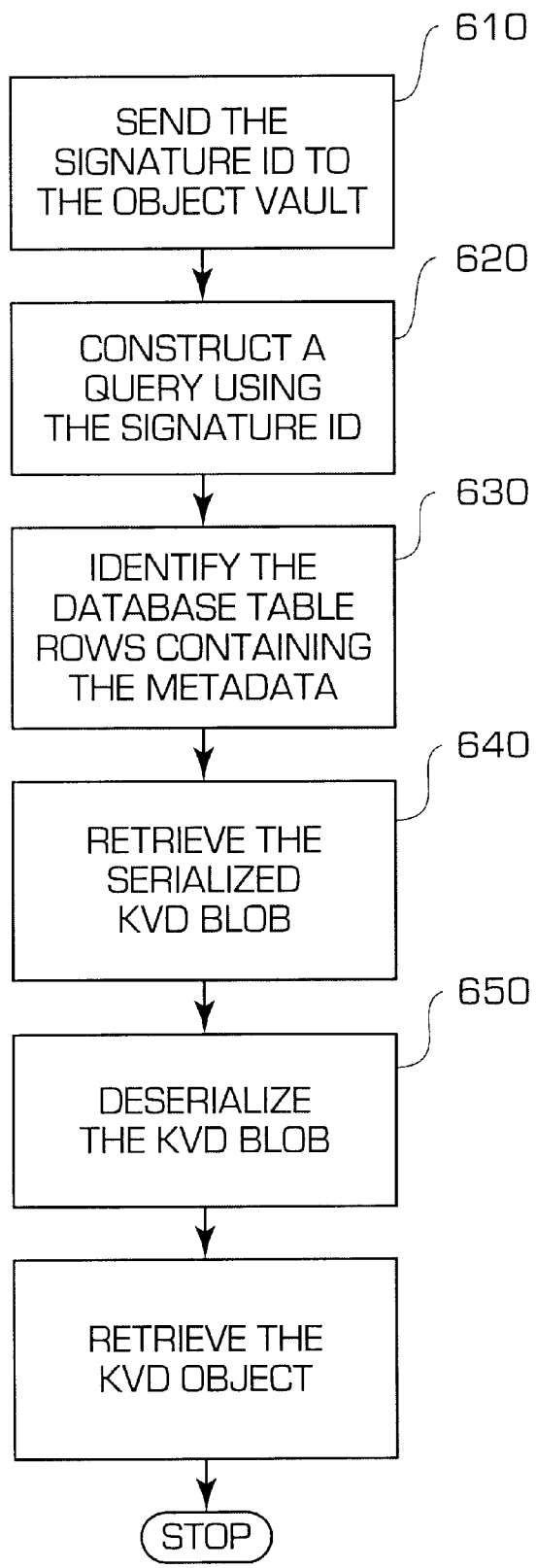
FIG. 6 is a flowchart depicting a retrieval operation for an object according to the present invention.

Once a KVD, or more generally an asset, has been stored in the digital library, it is assigned a signature ID. FIG. 6 shows a flowchart depicting the retrieval operation. To retrieve the KVD from the digital library, the signature ID is sent to the object vault in step 610. In step 620 the signature ID is used to construct a query into the digital library for the corresponding KVD. Upon identifying the database table and row that contains metadata for the asset in step 630, object vault 210 retrieves the serialized KVD blob in step 640 that is associated with the identified row. In step 650 object vault 210 deserializes the blob from a binary stream back into a KVD object. The KVD is returned to the user. Deserializing an object can be performed faster than reconstructing the object from the database tables and columns. However, if the serialized KVD blob cannot be instantiated, the object vault calls the structural type manger to reconstruct the keys and values of the KVD by traversing the tables and columns.

As described above, the present invention provides for a flexible means for object management in existing storage layers while requiring very few changes to existing software components, and no changes to the existing stored data. Moreover, the invention allows for conventional access to, and processing of that data with virtually no impact on performance.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An object management system for storing objects having a predetermined structural type, comprising:

an object vault;

a storage unit; and a structural type manager, wherein the object vault, the structural type manager and the storage unit are connected to each other, and the object vault stores the object in the storage unit based on information in the structural type manager and according to the structural type of the object.

2. An object management system according to claim 1, wherein the storage unit is a digital library.

3. An object management system according to claim 2, wherein the digital library comprises:

a library client having a client storage area;

an object server having an object storage area; and a library server including a library catalog, connected to the object server and the library client, wherein the library and object servers are in a distributed arrangement with the library client.

4. An object management system according to claim 2, further comprising an object-class interface, wherein the digital library is connected to the object vault and the structural type manager through the object-class interface.

5. An object management system according to claim 2, wherein the object vault retrieves:

the object from the digital library in response to a request for the object and receipt of a signature for the object.

6. An object management system according to claim 2, wherein the object vault comprises:

means to modify the object in the digital library.

7. An object management system according to claim 1, wherein the object is represented by a Key Value Dictionary (KVD), the KVD being a subclass of a dictionary, the dictionary including a unique key associated with one or more values, the KVD including a structural type key, wherein a value associated with the structural type key is one of a plurality of structural types.

8. An object management system according to claim 7, wherein the dictionary is a hash table.

9. An object management system according to claim 7, wherein the structural type manager comprises a mapping unit associating a key of the KVD with a database table and a column within the database table, wherein the value associated with the key is recorded said column within the database table.

10. An object management system according to claim 7, wherein the structural type manager comprises:

means for receiving the structural type key of the KVD;

means for retrieving a value associated with the received structural type key, the value being a structural type;

means for identifying a key associated with the said structural type indicated by the retrieved value;

means for retrieving an indicator of a database and an indicator of a column corresponding to the identified key; and means for storing the a value of the KVD associated with the identified key in the database and column indicated by the database and column indicators, respectively.

11. An object management system according to claim 1, wherein said object is a Java object.

12. An object management system according to claim 1, wherein the structural type manager comprises:

a first object oriented method to retrieve a database table identifier for a specified structural type;

a second object oriented method to retrieve an ordered list of key names for a specified structural type; and a third object oriented method to retrieve an ordered list of table columns for keys defined for a specified structural type.

13. An object management system according to claim 12, wherein the structural type manager further comprises:

a fourth object oriented method to create a structural type map;

a fifth object oriented method to create an attribute key for an existing structural type;

a sixth object oriented method to remove the attribute key; and a seventh object oriented method to remove structural type map.

14. A method of storing an object in an object management system having an object vault, a storage unit and a structural type manager, the method comprising:

(a) receiving the object at the object vault;

(b) retrieving from the object a value indicating a structural type of the object;

(c) retrieving from the structural type manager an indicator of an attribute associated with the structural type of the object, wherein the attribute is to be stored in the digital library;

(d) identifying a location where a value of the indicated attribute is to be stored;

(e) retrieving from the object the value of the indicated attribute;

(f) storing the retrieved value of the object in the identified location; and (g) storing the object in the storage unit.

15. A method according to claim 14, further comprising:

(h) serializing the object into a binary large object (blob);

(i) storing the blob in the storage unit; and (j) generating a signature identifying a storage location of the stored object and returning the signature to the object vault.

16. A method according to claim 15, wherein said object is a Java object.

17. A method according to claim 14, wherein the storage unit is a digital library.

18. A method according to claim 14, wherein the storage unit is a database.

19. A method according to claim 14, wherein said object is a Java object.

20. In an object management system having an object vault, a storage unit and a structural type manager, a method of retrieving an object comprising:

(a) sending to the object vault a signature corresponding to the object;

(b) querying the storage unit in response to the signature, to locate the object in the storage unit and identifying an attribute and a corresponding value satisfying the query;

(c) retrieving from the digital library a binary large object (blob) corresponding to the located object; and (d) constructing the object from the retrieved blob.

21. A computer program product for an object management system including an object vault, a structural type manager and a storage unit having an object server and a library server employing a database; wherein the object vault is connected to the structural type manager and the digital library, and the structural type manager is connected to the digital library; the computer program product including a computer readable medium comprising:

a computer-readable object vault code; and a computer-readable structural type manager code;

wherein the object vault code causes a value of a structural type indicator of the object to be sent to the structural type manager code in response to the object vault receiving an object for storage in the storage unit;

wherein the structural type manager includes a mapping of the structural type indicator to a location within the database, and in response to receipt of the value of the structural type indicator the structural type manager code causes an attribute for the structural type and a database identifier for the database in which a value of the attribute is to be stored, to be returned to the object vault; and wherein the object vault code directs storage of the value of the object associated with the returned attribute into the database location according to the database identifier, the object vault codes causes the object to be stored in the storage unit; and returns a identifier for the stored object.

* * * * *